US010938936B2

(12) United States Patent
Gharabally et al.

(10) Patent No.: US 10,938,936 B2
(45) Date of Patent: Mar. 2, 2021

(54) INTELLIGENT DOWNLOAD OF APPLICATION PROGRAMS

(71) Applicant: Apple Inc., Cupertino, CA (US)

(72) Inventors: Sam Gharabally, San Francisco, CA (US); Sean Kelly, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 198 days.

(21) Appl. No.: 16/103,801

(22) Filed: Aug. 14, 2018

(65) Prior Publication Data
US 2018/0352044 A1 Dec. 6, 2018

Related U.S. Application Data

(63) Continuation of application No. 14/293,790, filed on Jun. 2, 2014, now Pat. No. 10,084,874, which is a continuation of application No. 12/368,111, filed on Feb. 9, 2009, now Pat. No. 8,745,153.

(51) Int. Cl.
H04L 29/08 (2006.01)
G06F 8/61 (2018.01)

(52) U.S. Cl.
CPC ............ *H04L 67/2823* (2013.01); *G06F 8/61* (2013.01); *G06F 8/64* (2013.01); *H04L 67/02* (2013.01)

(58) Field of Classification Search
CPC ..... H04L 67/02; H04L 67/2823; H04L 51/06; H04L 65/601; H04L 69/08; G06F 8/61; G06F 8/64; G06F 16/95; G06F 16/9577
See application file for complete search history.

(56) References Cited

U.S. PATENT DOCUMENTS

| 5,848,064 | A | 12/1998 | Cowan |
| 6,226,618 | B1 | 5/2001 | Downs et al. |
| 6,496,979 | B1 | 12/2002 | Chen et al. |
| 6,510,236 | B1 | 1/2003 | Crane et al. |
| 6,510,466 | B1 * | 1/2003 | Cox ........................ G06F 9/451 709/229 |

(Continued)

FOREIGN PATENT DOCUMENTS

| AU | 2003220423 A1 | 10/2003 |
| AU | 2010200403 A1 | 8/2010 |

(Continued)

OTHER PUBLICATIONS

MS Launched New PlayReady DRM, ZDNet Korea at: http//www.zdnet.co.kr/news/news.sub.-view.asp?artice.sub.-id=0000003915-5398&type=det.

*Primary Examiner* — Kostas J Katsikis
(74) *Attorney, Agent, or Firm* — Invoke

(57) ABSTRACT

Improved techniques for controlling delivery (e.g., download) of application programs from a remote application repository to different client computing devices are disclosed. Application programs are often built to operate on computing devices that have certain hardware capabilities. Hence, application programs available for download from a remote application repository might not be suitable execution on all client computing devices that are able to access the remote application repository. The improved techniques for controlling delivery can operate to permit the applications to be received by only those client computing devices that have the required hardware capabilities to properly operate the application programs.

20 Claims, 9 Drawing Sheets

(56) References Cited

U.S. PATENT DOCUMENTS

| | | | |
|---|---|---|---|
| 6,643,506 B1 | 11/2003 | Criss et al. | |
| 6,832,373 B2 | 12/2004 | O'Neill | |
| 6,898,768 B1* | 5/2005 | Theodossy | G06F 8/65 716/111 |
| 6,925,489 B1 | 8/2005 | Curtin | |
| 7,107,588 B2* | 9/2006 | Gentry | G06F 8/61 717/174 |
| 7,155,681 B2 | 12/2006 | Mansour et al. | |
| 7,181,500 B2* | 2/2007 | Jen | H04L 29/06 707/999.003 |
| 7,299,202 B2 | 11/2007 | Swanson | |
| 7,395,534 B2* | 7/2008 | Alcazar | G06F 9/44521 717/174 |
| 7,424,719 B2* | 9/2008 | Duplichan | G06F 9/44536 717/168 |
| 7,430,590 B1* | 9/2008 | Rive | H04L 29/06 709/203 |
| 7,461,353 B2 | 12/2008 | Rohrabaugh et al. | |
| 7,516,104 B1* | 4/2009 | Scardino | G06F 8/61 705/50 |
| 7,526,450 B2 | 4/2009 | Hughes et al. | |
| 7,536,599 B2* | 5/2009 | Paliwal | G06F 11/2247 714/15 |
| 7,537,158 B1* | 5/2009 | Cox | G06Q 30/0603 235/385 |
| 7,644,405 B2* | 1/2010 | Rao | G06F 8/65 717/171 |
| 7,735,079 B1* | 6/2010 | Davis | G06F 8/61 717/174 |
| 7,743,365 B2* | 6/2010 | Wehrs | G06Q 10/00 717/124 |
| 7,792,941 B2* | 9/2010 | Fried | H04L 41/5083 709/223 |
| 7,865,889 B1* | 1/2011 | Bird | G06F 11/3672 717/168 |
| 7,877,461 B1 | 1/2011 | Rimmer | |
| 7,925,554 B1 | 4/2011 | Sirota et al. | |
| 7,962,634 B2* | 6/2011 | Cortos | G06F 16/48 709/229 |
| 7,962,788 B2* | 6/2011 | Manglik | G06F 8/60 714/25 |
| 7,984,436 B1* | 7/2011 | Murray | G06F 9/44536 717/175 |
| 8,015,237 B2* | 9/2011 | Muller | H04N 7/17309 709/201 |
| 8,359,348 B2* | 1/2013 | Robbin | G06Q 20/04 705/51 |
| 8,365,161 B2* | 1/2013 | Komano | G06F 8/65 717/170 |
| 8,458,098 B1* | 6/2013 | Scardino | G06F 8/61 705/57 |
| 8,468,515 B2* | 6/2013 | Chen | G06F 8/65 717/170 |
| 8,473,479 B2* | 6/2013 | Suitts | H04N 7/17336 707/695 |
| 8,595,186 B1 | 11/2013 | Mandyam et al. | |
| 8,745,153 B2* | 6/2014 | Gharabally | H04L 67/02 709/217 |
| 8,893,110 B2* | 11/2014 | Kapadekar | H04L 41/00 717/171 |
| 9,076,176 B2* | 7/2015 | Fosback | G06Q 30/0603 |
| 9,378,004 B1 | 6/2016 | Macaluso | |
| 2002/0002039 A1 | 1/2002 | Qureshey et al. | |
| 2002/0032763 A1* | 3/2002 | Cox | H04L 69/329 709/223 |
| 2002/0053078 A1 | 5/2002 | Holtz et al. | |
| 2002/0129064 A1 | 9/2002 | Guthrie | |
| 2002/0131404 A1 | 9/2002 | Mehta et al. | |
| 2003/0018767 A1 | 1/2003 | Chatani et al. | |
| 2003/0046680 A1* | 3/2003 | Gentry | G06F 8/61 717/176 |
| 2003/0066059 A1 | 4/2003 | Moon et al. | |
| 2003/0084096 A1 | 5/2003 | Starbuck et al. | |
| 2003/0167334 A1* | 9/2003 | Butler | H04L 67/02 709/227 |
| 2003/0181196 A1 | 9/2003 | Davidov et al. | |
| 2003/0227477 A1* | 12/2003 | Kadiwala | G06F 8/64 715/748 |
| 2004/0034853 A1* | 2/2004 | Gibbons | G06F 16/958 717/174 |
| 2004/0043763 A1 | 3/2004 | Minear et al. | |
| 2004/0083474 A1 | 4/2004 | McKinlay et al. | |
| 2004/0093595 A1* | 5/2004 | Bilange | G06Q 30/0645 717/171 |
| 2004/0192282 A1 | 9/2004 | Vasudevan | |
| 2004/0213614 A1 | 10/2004 | Uchida | |
| 2004/0254883 A1 | 12/2004 | Kondrk et al. | |
| 2004/0267965 A1 | 12/2004 | Vasudevan et al. | |
| 2005/0091511 A1* | 4/2005 | Nave | G06Q 30/0241 713/185 |
| 2005/0136939 A1 | 6/2005 | Mountain et al. | |
| 2005/0273489 A1 | 12/2005 | Pecht et al. | |
| 2006/0004914 A1 | 1/2006 | Kelly et al. | |
| 2006/0008256 A1 | 1/2006 | Khedouri et al. | |
| 2006/0025163 A1 | 2/2006 | Smith et al. | |
| 2006/0037016 A1* | 2/2006 | Saha | G06F 9/5061 717/178 |
| 2006/0064759 A1 | 3/2006 | Agranat | |
| 2006/0074750 A1 | 4/2006 | Clark et al. | |
| 2006/0161635 A1 | 7/2006 | Lamkin et al. | |
| 2006/0168576 A1* | 7/2006 | Phung | G06F 8/65 717/168 |
| 2006/0225047 A1* | 10/2006 | Brothers | G06F 9/5044 717/127 |
| 2007/0198841 A1 | 8/2007 | Lundblade et al. | |
| 2008/0004886 A1 | 1/2008 | Hames et al. | |
| 2008/0091845 A1 | 4/2008 | Mills et al. | |
| 2008/0127161 A1* | 5/2008 | Atas | G06F 21/57 717/168 |
| 2008/0140537 A1* | 6/2008 | Powell | G06Q 30/0601 707/705 |
| 2008/0189099 A1 | 8/2008 | Friedman et al. | |
| 2008/0189542 A1 | 8/2008 | Tseng et al. | |
| 2008/0228503 A1* | 9/2008 | Buchheit | G06Q 30/0603 705/1.1 |
| 2008/0242284 A1 | 10/2008 | Vechey et al. | |
| 2008/0263648 A1 | 10/2008 | Sathyan et al. | |
| 2008/0301231 A1 | 12/2008 | Mehta et al. | |
| 2009/0006978 A1 | 1/2009 | Swift et al. | |
| 2009/0037287 A1* | 2/2009 | Baitalmal | G06F 21/105 705/27.1 |
| 2009/0063301 A1 | 3/2009 | Ward et al. | |
| 2009/0064135 A1* | 3/2009 | Jimmerson | G06F 8/61 717/178 |
| 2009/0125413 A1* | 5/2009 | Le Chevalier | H04N 21/26258 705/26.1 |
| 2009/0138117 A1* | 5/2009 | Bagwell | G05B 19/41865 700/110 |
| 2009/0197580 A1 | 8/2009 | Gupta et al. | |
| 2009/0235284 A1* | 9/2009 | Steventon | G06F 9/4486 719/328 |
| 2009/0254912 A1 | 10/2009 | Roundtree et al. | |
| 2009/0259515 A1* | 10/2009 | Belimpasakis | G06Q 30/02 709/218 |
| 2009/0276332 A1* | 11/2009 | Gharabally | G06Q 30/0601 705/26.1 |
| 2009/0276433 A1* | 11/2009 | Fosback | G06Q 30/0603 |
| 2009/0282088 A1 | 11/2009 | Thomas et al. | |
| 2009/0307105 A1 | 12/2009 | Lemay et al. | |
| 2009/0307682 A1* | 12/2009 | Gharabally | G06F 8/65 717/172 |
| 2009/0307683 A1* | 12/2009 | Gharabally | G06F 8/65 717/173 |
| 2010/0011354 A1* | 1/2010 | Gharabally | G06F 9/454 717/178 |
| 2010/0088367 A1 | 4/2010 | Brown et al. | |
| 2010/0131854 A1* | 5/2010 | Little | H04L 41/5054 715/735 |
| 2010/0159898 A1 | 6/2010 | Krzyzanowski et al. | |

(56) References Cited

U.S. PATENT DOCUMENTS

| | | | |
|---|---|---|---|
| 2010/0162231 A1* | 6/2010 | Lanchares | G06F 16/2365 717/177 |
| 2010/0180107 A1* | 7/2010 | Chaganti | H04L 41/0806 713/1 |
| 2010/0205274 A1* | 8/2010 | Gharabally | G06F 8/61 709/217 |
| 2010/0287048 A1 | 11/2010 | Ramer et al. | |
| 2011/0066503 A1 | 3/2011 | Kanapur et al. | |
| 2012/0036220 A1* | 2/2012 | Dare | H04L 67/04 709/217 |
| 2012/0246631 A1* | 9/2012 | Chen | G06F 8/65 717/172 |
| 2013/0326606 A1* | 12/2013 | Kelly | H04W 12/0605 726/7 |
| 2014/0280462 A1 | 9/2014 | Gharabally et al. | |
| 2015/0277893 A1* | 10/2015 | Kelly | H04W 12/08 717/169 |
| 2018/0352044 A1* | 12/2018 | Gharabally | G06F 8/61 |

FOREIGN PATENT DOCUMENTS

| | | | |
|---|---|---|---|
| CN | 1732454 A | 2/2006 | |
| CN | 101799765 A | 8/2010 | |
| EP | 1117048 A1 * | 7/2001 | ............ G06F 40/151 |
| EP | 1117050 A1 * | 7/2001 | ............ H04L 29/06 |
| EP | 2224336 A1 | 9/2010 | |
| GB | 2402781 A | 12/2004 | |
| JP | 10-301760 A | 11/1998 | |
| JP | 2000-250877 A | 9/2000 | |
| JP | 2002-140618 A | 5/2002 | |
| JP | 2002-182768 A | 6/2002 | |
| JP | 2003-085444 A | 3/2003 | |
| JP | 2003-143581 A | 5/2003 | |
| JP | 2004-171291 A | 6/2004 | |
| JP | 2004-537109 A | 12/2004 | |
| JP | 2005-070984 A | 3/2005 | |
| JP | 2005-251167 A | 9/2005 | |
| JP | 2005-310062 A | 11/2005 | |
| JP | 2006-520026 A | 8/2006 | |
| JP | 2010-182309 A | 8/2010 | |
| KR | 10-1997-0012181 A | 3/1997 | |
| KR | 10-2003-0021791 A | 3/2003 | |
| KR | 10-0629464 B1 | 9/2006 | |
| KR | 10-0830678 B1 | 5/2008 | |
| KR | 10-2008-0056522 A | 6/2008 | |
| KR | 10-2010-0091125 A | 8/2010 | |
| WO | 02/32026 A1 | 4/2002 | |
| WO | 2003/007172 A1 | 1/2003 | |
| WO | 2003/083688 A1 | 10/2003 | |
| WO | 2004/061608 A2 | 7/2004 | |
| WO | 2008/147567 A1 | 12/2008 | |

* cited by examiner

INTELLIGENT DOWNLOAD OF APPLICATION PROGRAMS

INCORPORATION BY REFERENCE; DISCLAIMER

Each of the following applications are hereby incorporated by reference: application Ser. No. 14/293,790 filed on Jun. 2, 2014; application Ser. No. 12/368,111 filed on Feb. 9, 2009. The Applicant hereby rescinds any disclaimer of claim scope in the parent application(s) or the prosecution history thereof and advises the USPTO that the claims in this application may be broader than any claim in the parent application(s).

BACKGROUND OF THE INVENTION

Field of the Invention

The present invention relates to download of applications programs and, more particularly, to managing download of application programs to different computing devices.

Description of the Related Art

Today, it is common for users to access on-line repositories to acquire digital media assets, such as songs, television shows and movies. More recently, on-line repositories have also supported download of application programs. The typical interaction with an on-line media repository is that a user will browse the on-line repository from a personal computing device, select one or more items to be downloaded, and then receive digital delivery of the items at the personal computing device via a network.

Computing devices take many different forms and have different functionalities and capacities. For example, computing devices can be wearable, hand-held, portable or desktop. The form factor and functionality of these computing devices also tend to be different. For example, desktop computers tend to have the most processing power and data storage capacity. Hand-held computing device are small and light weight but tend to lack the high processing power and data storage of desktop computers. Different computing devices of the same form factor can even have different capabilities depending on hardware components (e.g., GPS system, wireless communications, microphone, speaker, etc.) and/or software components (e.g., operating system).

Given the wide variety of computing devices, application programs are typically built to operate on certain hardware and software platforms. When such applications are provided to an on-line repository for distribution, the applications are available for download to others regardless of their hardware platform and/or software platform. While an on-line repository could display information about required minimum hardware and/or software components for an application program, users might still download the application program onto computing devices that lack the required minimum hardware and/or software components. As a result, the application program would not function properly, if at all, on the computing devices. Consequently, users are dissatisfied with the application program even through the problem results from users' computing devices not the application program.

Thus, there is a need for improved approaches to manage download of application programs to compatible computing devices.

SUMMARY OF THE INVENTION

The invention pertains to controlled application delivery (e.g., download) from a remote application repository to different client computing devices. Application programs are often built to operate on computing devices that have certain hardware and/or software capabilities. Hence, application programs available for download from a remote application repository might not be suitable execution on all client computing devices that are able to access the remote application repository. According to one aspect, the invention can operate to permit only those client computing devices that have the required hardware and/or software capabilities to receive the application programs. In one embodiment, restrictions imposed can allow users of client computing devices to view information about the application programs but prevent download to those client computing devices lacking the required hardware and/or software capabilities. In another embodiment, warnings imposed can allow users of client computing devices lacking the required hardware and/or software capabilities to be warned prior to downloading of application programs to those client computing devices. In still another embodiment, restrictions imposed can filter availability of information about application programs available from the remote application repository such that users can only view information regarding those applications they are able to download onto such client computing devices.

In general, the invention can be implemented in numerous ways, including as a method, system, device, or apparatus (including graphical user interface and computer readable medium). Several embodiments of the invention are discussed below.

As a computer implemented method for downloading application programs to a hand-held computing device from an on-line application repository, one embodiment of the invention can, for example, include at least: accessing the on-line application repository; navigating the on-line application repository to select an application program; displaying application information pertaining to the selected application program; receiving a download request; retrieving a device type for the hand-held computing device; determining whether the device type is one of one or more supported device types for the selected application program; permitting download of the selected application program to the hand-held computing device if it is determined that the device type is one of the one or more supported device types for the selected application program; and denying download of the selected application program to the hand-held computing device if it is determined that the device type is not one of the one or more supported device types for the selected application program.

As a computer implemented method for downloading application programs to a hand-held computing device from an on-line application repository, one embodiment of the invention can, for example, include at least: accessing the on-line application repository; navigating the on-line application repository to select an application program; displaying application information pertaining to the selected application program; receiving a download request to download the selected application program; retrieving device information for the hand-held computing device; determining whether the hand-held computing device is a supported device for the selected application program based on the device information; permitting download of the selected application program to the hand-held computing device if it is determined that the hand-held computing device is a supported device for the selected application program; and displaying message that download of the selected application program to the hand-held computing device is denied if it is determined that the hand-held computing device is not a supported device for the selected application program.

As a computer readable medium including at least executable computer program code stored thereon for downloading application programs to a portable computing device from an on-line application repository, one embodiment of the invention can, for example, include at least: computer program code for accessing the on-line application repository; computer program code for navigating the on-line application repository to select an application program; computer program code for displaying application information pertaining to the selected application program; computer program code for receiving a download request to download the selected application program; computer program code for retrieving device information for the portable computing device; computer program code for determining whether the portable computing device is a supported device for the selected application program based on the device information; computer program code for permitting download of the selected application program to the portable computing device if it is determined that the portable computing device is a supported device for the selected application program; and computer program code for denying download of the selected application program to the portable computing device if it is determined that the portable computing device is not a supported device for the selected application program.

As a computer readable medium including at least executable computer program code stored thereon for acquiring application programs at a client device, one embodiment of the invention can, for example, include at least: computer program code for navigating through application programs to select an application program; computer program code for receiving a user acquisition request to acquire the selected application program; computer program code for retrieving device capabilities for the client device; computer program code for determining whether the client device supports operation of the selected application program based on the device capabilities; computer program code for acquiring the selected application program at the client device if it is determined that the client device supports operation of the selected application program; and computer program code for denying acquisition of the selected application program at the client device if it is determined that the client device does not support operation of the selected application program.

As a computer-implemented method for installation of application programs on a hand-held computing device, one embodiment of the invention can, for example, include at least: receiving a plurality of application programs available for installation on the hand-held computing device, each of the application programs having associated device requirements; selecting at least one of the application programs to be installed on the hand-held computing device; and providing controls for installation of the selected application program on the hand-held computing device if the hand-held computing device meets the associated device requirement of the selected application program.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to controlled application delivery (e.g., download) from a remote application repository to different client computing devices. Application programs are often built to operate on computing devices that have certain hardware and/or software capabilities. Hence, application programs available for download from a remote application repository might not be suitable execution on all client computing devices that are able to access the remote application repository. According to one aspect, the invention can operate to permit only those client computing devices that have the required hardware and/or software capabilities to receive the application programs. In one embodiment, restrictions imposed can allow users of client computing devices to view information about the application programs but prevent download to those client computing devices lacking the required hardware and/or software capabilities. In another embodiment, warnings imposed can allow users of client computing devices lacking the required hardware and/or software capabilities to be warned prior to downloading of application programs to those client computing devices. In still another embodiment, restrictions imposed can filter availability of information about application programs available from the remote application repository such that users can only view information regarding those applications they are able to download onto such client computing devices.

Embodiments of the invention are discussed below with reference to FIGS. 1-7C. However, those skilled in the art will readily appreciate that the detailed description given herein with respect to these figures is for explanatory purposes as the invention extends beyond these limited embodiments.

Figure 1:
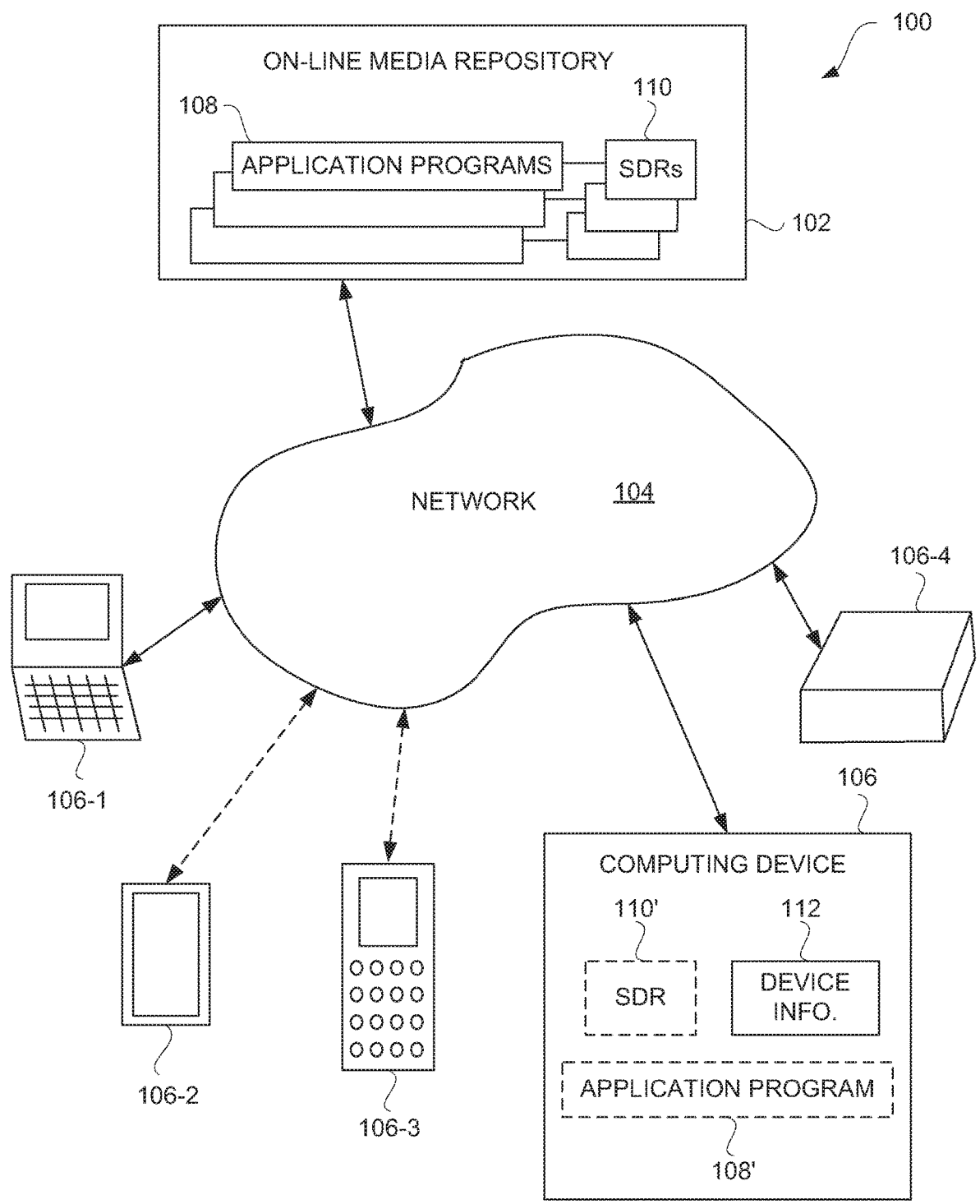
FIG. 1 is a block diagram of an application distribution system according to one embodiment of the invention.

FIG. 1 is a block diagram of an application distribution system 100 according to one embodiment of the invention. The application distribution system 100 includes an on-line media repository 102 that couples to a network 104 so as to allow a plurality of computing devices 106 to interact with the on-line media repository 102. The on-line media repository 102 can be implemented by a single server computer or distributed over multiple server computers. In one implementation, the network 104 can refer to one or more data networks, typically, high data-bandwidth networks, namely, wired networks, such as the Internet, Ethernet, gigabit Ethernet, and fiber optic, as well as wireless networks such as IEEE 802.11(a), (b) or (g) (WiFi), IEEE 802.16 (WiMax), and Ultra-Wide Band (UWB).

The on-line media repository 102 stores a plurality of application programs 108. These application programs 108 can be computer programs that operate on some or all of computing devices 106. Developers can produce application programs and submit them to the on-line media repository 108 for distribution. Here, the on-line media repository 108 can serve to store and distribute a large number of application programs. The computing devices 106 can have different form factors and capabilities. For example, as shown in FIG. 1, the computing device 106 can pertain to a portable computer 106-1, hand-held computer or personal digital assistant (PDA) 106-2, mobile phone 106-3 (e.g., cellular phone), or set-top box 106-4.

According to one embodiment of the invention, to distribute the application programs 108 from the on-line media repository 102 in an improved manner, the on-line media repository 102 stores supported device requirements (SDRs) 110 for some or all of the application programs 108. The supported device requirements 110 can be defined by the developer and provided to the on-line media repository 102 when providing the application program 108. The supported device requirements 110 pertained to minimum device requirements that any computing device 106 must have in order for the application program 108 to properly operate on the computing device 106. As an example, the on-line media repository 102 can limit distribution of the application programs 108 to only those of the computing devices 106 that meet the supported device requirements 110. In one embodiment, the on-line media repository 102 can enforce the supported device requirements 110 for the application programs 108.

The computing device 106 can include device information 112. The device information 112 can pertained to the device capabilities of the computing device 106. Hence, when the user of the computing device 106 accesses the on-line media repository 102 via the network 104, which can pertained to the Internet, the computing device 106 can initially receive information descriptive of the one or more application programs 108 available from the on-line media repository 102. Through user interaction with the computing device 106, the user can navigate through the information descriptive of the one and more application programs 108 available from the on-line media repository 102 to select a particular application program 108 that the user desires to receive at the computing device 106. Together with the information descriptive of the one and more application programs 108, the computing device 106 can also receive supported device requirements 110'. In the event that the user requests to receive the particular application program 108, the computing device 106 can operate to evaluate whether the computing device 106 is able to adequately support the particular application program 108. In one embodiment, the computing device 106 compares the supported device requirements 110' with the device information 112 to determine whether the computing device 106 is able to adequately support the particular application program 108. If the computing device 106 determines that the computing device 106 is able to adequately support the particular application program, the particular application program 108 can be downloaded from the on-line media repository 102 through the network 104 to the computing device 106. Thereafter, the application program 108 can be installed to become an installed application program 108' on the computing device 106.

Figure 2:
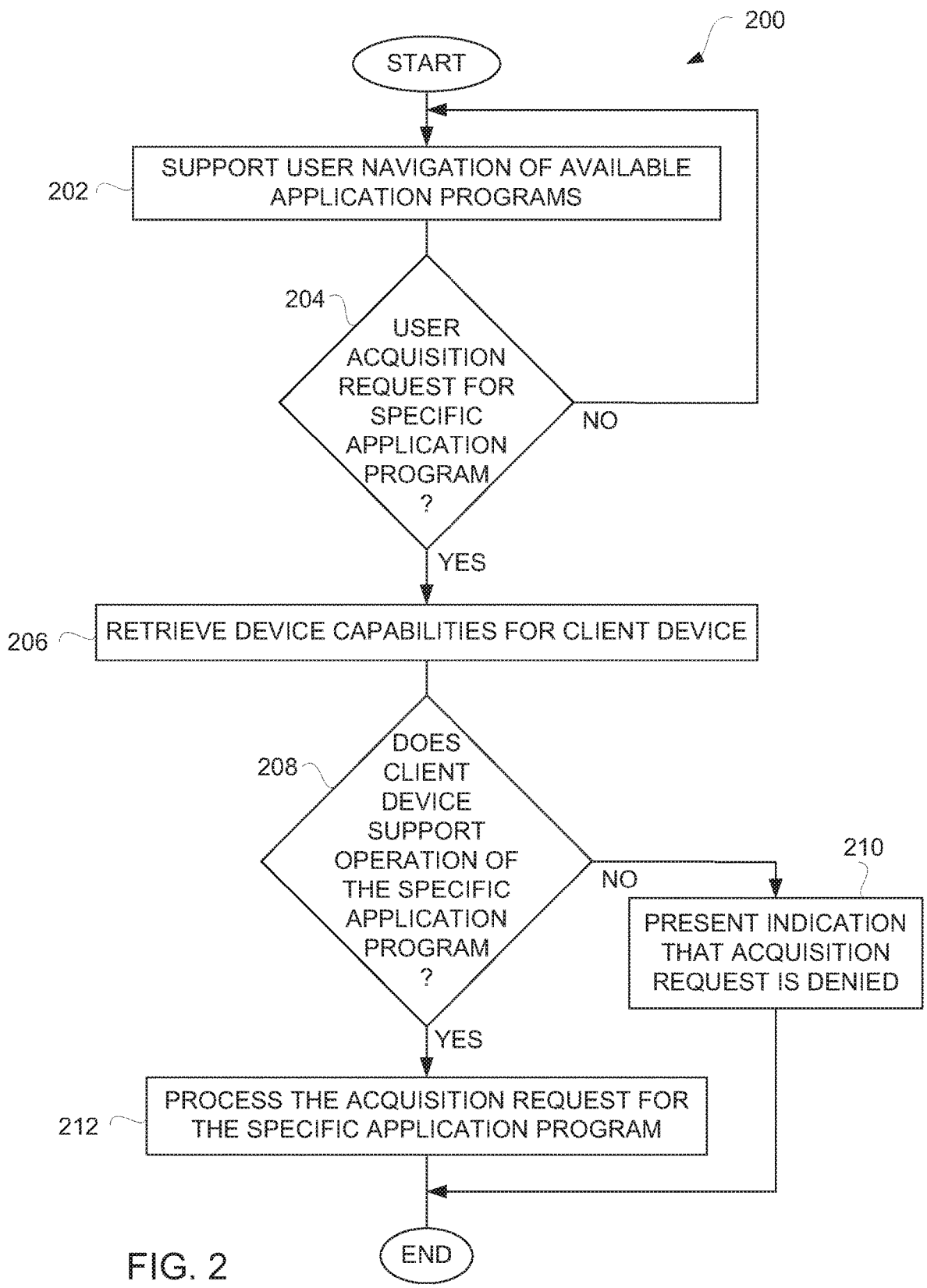
FIG. 2 is a flow diagram of an application acquisition process according to one embodiment of the invention.

FIG. 2 is a flow diagram of an application acquisition process 200 according to one embodiment of the invention. The application acquisition process 200 is, for example, processing performed at a computing device to determine whether a user requesting an application program is permitted to acquire the application program.

The application acquisition process 200 can support 202 user navigation of available application programs. The user navigation of the available application programs allows a user to identify a specific application program that they desire to acquire or install. Following the support 202 for the user navigation in which a specific application program is identified, a decision 204 can determine whether a user acquisition request for a specific application program has been received. When the decision 204 determines that a user acquisition request has not been received, the application acquisition process 200 can return to repeat the block 202. Alternatively, when the decision 204 determines that a user acquisition request for a specific application program has been received, device capabilities for a client device to receive the specific application program can be retrieved 206. Typically, the client device stores its device capabilities in an accessible data storage region within the client device. The client device can store its device capabilities directly or can store a type indicator that represents or references device capabilities for the client device.

Next, a decision 208 determines whether the client device supports operation of the specific application program. Here, through use of the device capabilities for the client device, the application acquisition process 200 can evaluate whether the client device supports operation of the specific application program. When the decision 208 determines that the client device does not support operation of the specific application program, an indication that the acquisition request is denied can be presented 210. On the other hand, when the decision 208 determines that the client device does support operation of the specific application program, the acquisition request for the specific application program can be processed 212. As a result of the processing 212 of the application request, the specific application program is delivered to the client device. Once the specific application program is provided to the client device, the client device can install and utilize the specific application program. Following the blocks 210 or 212, the application acquisition process 200 can end.

Figure 3:
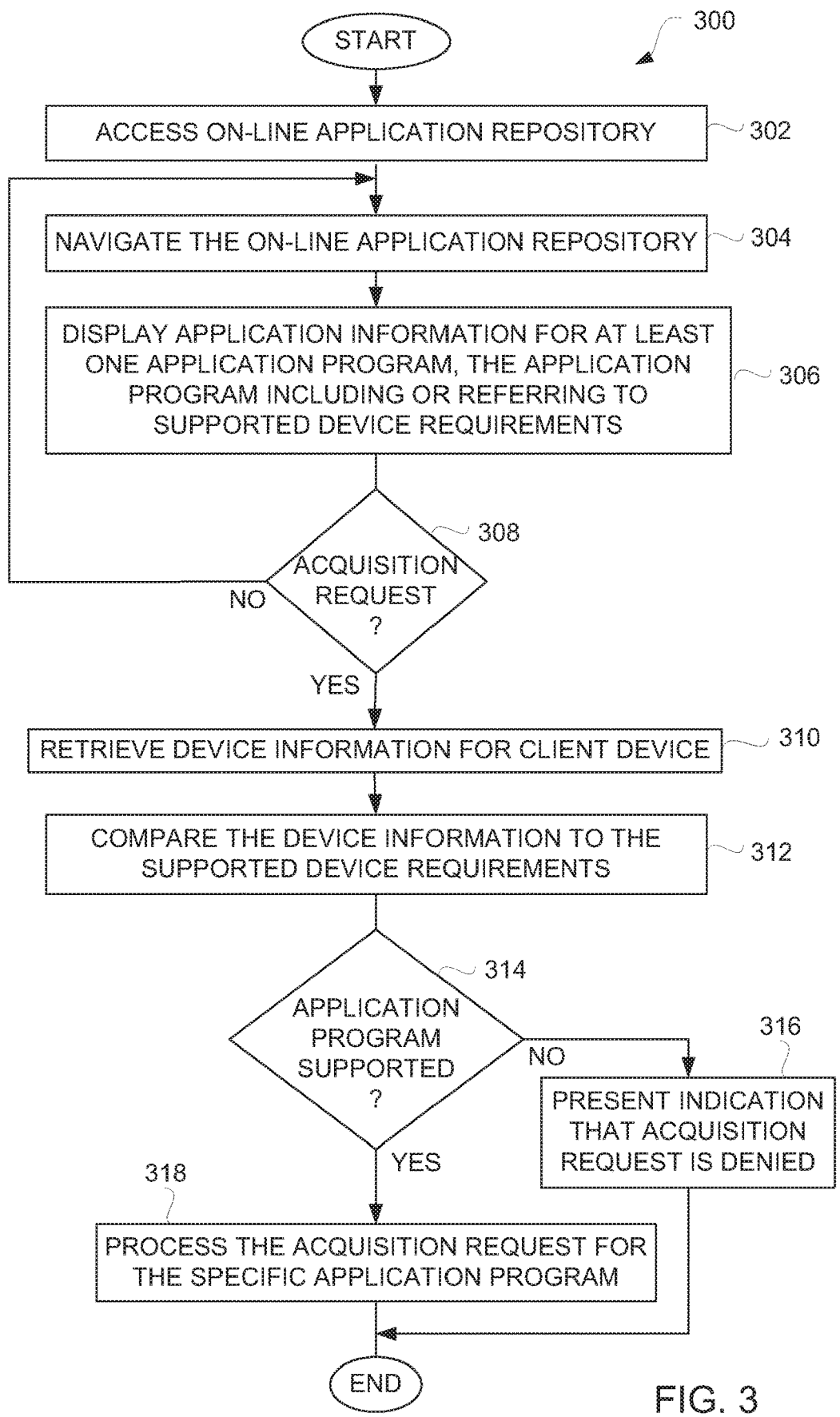
FIG. 3 is a flow diagram of an application acquisition process according to another embodiment of the invention.

FIG. 3 is a flow diagram of an application acquisition process 300 according to one embodiment of the invention. The application acquisition process 300 can, for example, be performed by a client device. The client device is a computing device capable of executing computer programs. For example, the application acquisition process 300 can be performed by any of the computing devices 106 illustrated in FIG. 1.

The application acquisition process 300 can access 302 an on-line application repository that stores a plurality of application programs that are available for distribution. As one example, the on-line application repository can pertain to the on-line media repository 102 illustrated in FIG. 1. The on-line application repository can then be navigated 304. Through the navigation 304, application information for at least one application program can be displayed 306. For example, the application information can be displayed on a display device associated with the computing device. The application program has supported device requirements for the application program. The supported device requirements can pertain to minimum hardware and/or software components for a computing device to properly operate the computing device. For example, the minimum hardware requirements might require the computing device to have hardware components, such as a GPS system, a wireless communications, a microphone, a speaker, etc., and the minimum software requirements might require that the computing device have software components, such as a particular operating system. The supported device requirements can be contained within the application information or otherwise associated with the application program. For example, the application information can be provided as a markup language page, such as a webpage, that contains a description (e.g., XML description) of the supported device requirements.

Next, a decision 308 can determine whether an acquisition request has been received. When the decision 308 determines that an acquisition request has not been received, the application acquisition process 300 can return to repeat the block 304 and subsequent blocks so that the navigation 304 of the on-line application repository and the display 306 of application information can continue.

On the other hand, once the decision 308 determines that an acquisition request has been received, device information for the client device can be retrieved 310. The device information for the client device describes (directly or indirectly) the device functionalities for the client device. The device information can be compared 312 to the supported device requirements for the application program. Based on the comparison 312, a decision 314 can determine whether the application program is supported by the client device. When the decision 314 determines that the application program is not supported by the client device, an indication that the acquisition request is denied can be presented 316. Alternatively, when the decision 314 determines that the application program is supported by the client device, the acquisition request for the specific application program can be processed 318, whereby the specific application program can be received at the client device from the on-line application repository. Following the blocks 316 or 318, the application acquisition process 300 can end.

Figure 4:
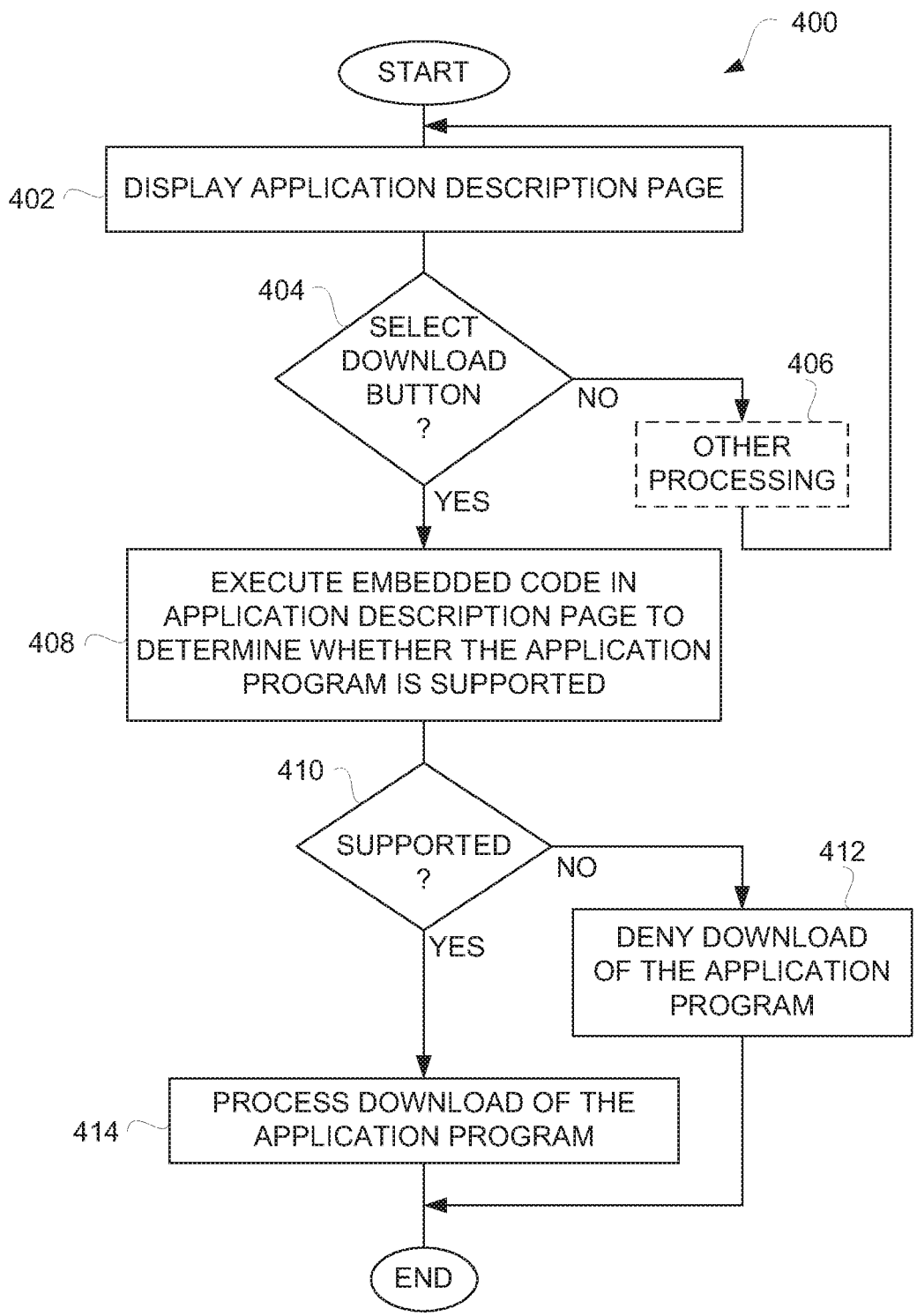
FIG. 4 is a flow diagram of an application download process according to one embodiment of the invention.

FIG. 4 is a flow diagram of an application download process 400 according to one embodiment of the invention. The application download process 400 is, for example, performed by a computing device, such as any of the computing devices 106 illustrated in FIG. 1.

The application download process 400 can display 402 an application description page. The application description page can be provided by an on-line applications store that is hosted by a remote server. For example, the on-line media repository 102 can pertain to a remote server that hosts an on-line applications store. The application description page can pertain to a markup language page, such as a webpage, that can be displayed by a program or browser operating at the computing device. The application description page provides a description of a particular application program and also includes one or more user interface controls, such as virtual buttons. At least one of the virtual buttons is a download button that, on selection, requests to download the application program from the remote server to the computing device. Following the display 402 of the application description page, a decision 404 determines whether a download button on the application description page has been selected. When the decision 404 determines that a download button has not been selected, other processing 406 can be optionally performed before the application download process 400 returns to repeat the block 402 so that the user can continue to review and interact with the application description page.

On the other hand, when the decision 404 determines that a download button has been selected, embedded code in the application description page can be executed (including interpreted) 408 to determine whether the application program is supported by the computing device (client device) performing the application download process 400. A decision 410 can then determine whether the application program is supported by the computing device. Here, it is determined using the embedded code whether the particular application program is supported by the computing device. In one implementation, the supported device requirements provided with the application description page can be checked against device information known by the computing device. As one example, the embedded code can be provided in a scripting language, such as JavaScript. When the decision 410 determines that the application program is not supported, download of the application program can be denied 412. In this case, since the application program cannot properly be utilized on the computing device, the download request made by the selection of the download button is denied 412. Alternatively, when the decision 410 determines that the application program is supported, download of the application program to the computing device can be processed 414. Following the blocks 412 or 414, the application download process 400 can end.

Figure 5:
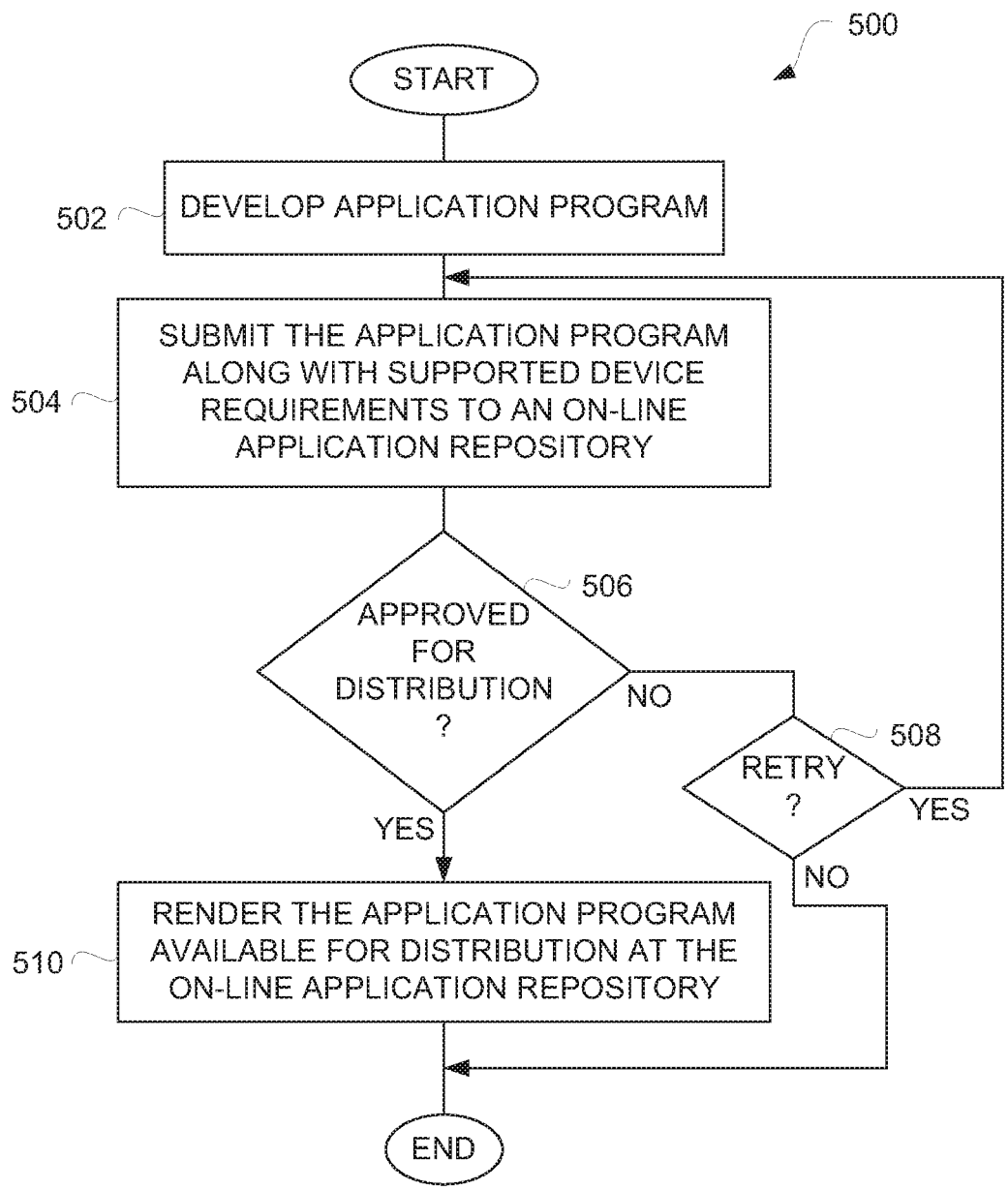
FIG. 5 is a flow diagram of an application availability process according to one embodiment of the invention.

FIG. 5 is a flow diagram of an application availability process 500 according to one embodiment of the invention. The application availability process 500 can be utilized to render application programs available for distribution by an on-line application repository. For example, the on-line application repository is, for example, the on-line media repository 102 illustrated in FIG. 1.

The application availability process 500 initially begins with an application program being developed 502. Here, a software developer can develop an application program to be utilized on a computing device. Next, the application program can be submitted 504 along with supported device requirements to an on-line application repository. The developer submits 504 application program to the on-line application repository so that the on-line application repository can assist the developer with distribution of the application program to numerous users. By providing the supported device requirements, the developer can thus inform the on-line application repository of the requirements on the computing device in order for the application program to operate properly.

Once the application program has been submitted 504, a decision 506 can determine whether the application program is approved for distribution. Here, the on-line application repository can perform one or more manual or automated checks or evaluations to determine whether the application program is suitable for distribution via the on-line application repository. When the decision 506 determines that the application is not approved for distribution, a decision 508 can determine whether the submission is to be retried. When the decision 580 determines that the submission is to be retried, the application availability process can return to repeat the block 504 so that the developer can again submit 504 the application program to the on-line application repository. Here, the developer is able to make another attempt to have the application program approved for distribution by the on-line application repository. Hence, the developer may be able to correct defects in their earlier submission and then resubmit their application program to the on-line application repository.

On the other hand, when the decision 506 determines that the application program has been approved for distribution, the application program is rendered 510 available for distribution at the on-line application repository. This allows various users of computing devices to interact with the on-line application repository to acquire the application program. Following the block 510, or following the decision 508 when the submission is not to be retried, the application availability process 500 can end.

Figure 6:
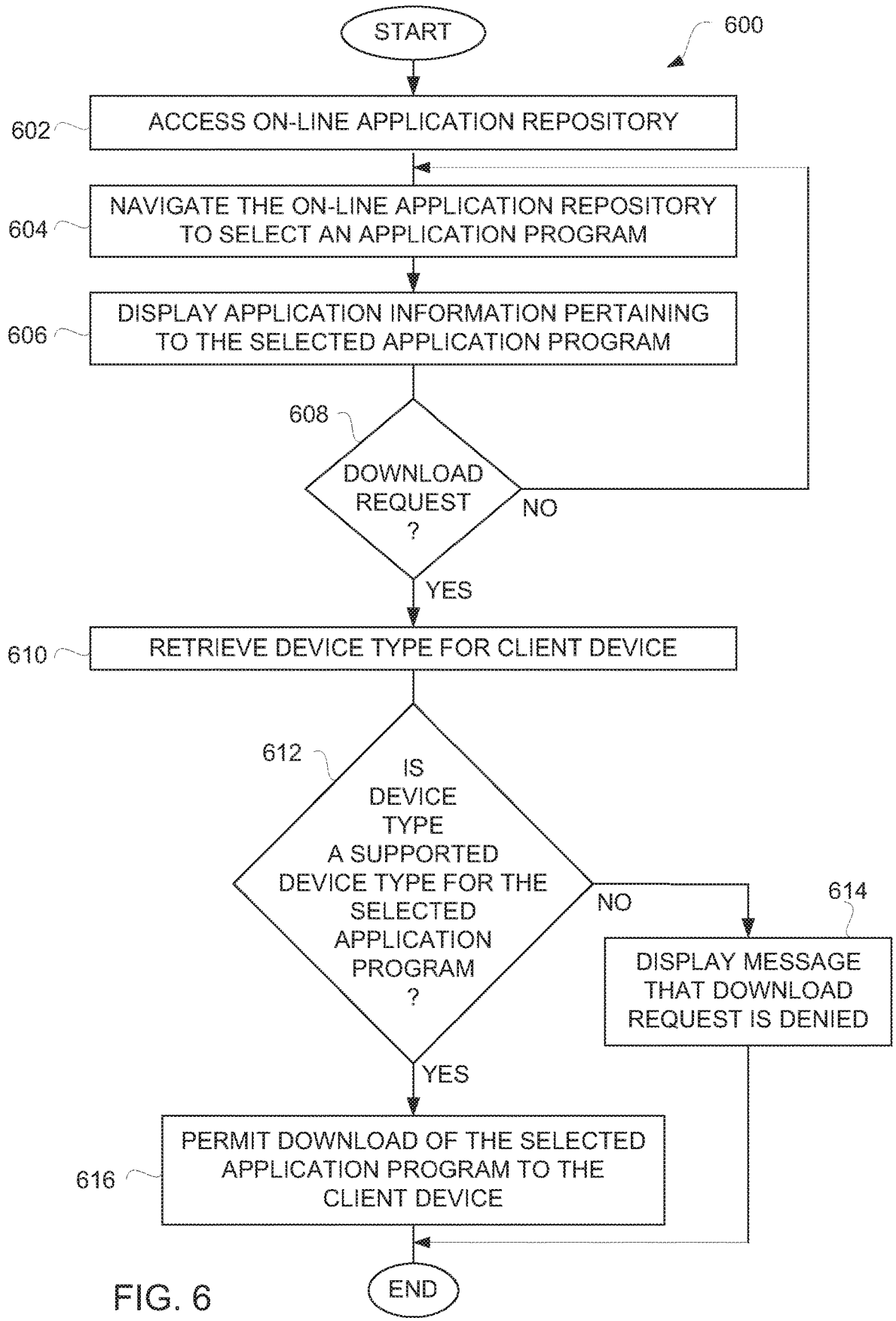
FIG. 6 is a flow diagram of an application download process according to another embodiment of the invention.

FIG. 6 is a flow diagram of an application download process 600 according to one embodiment of the invention. The application download process 600 can, for example, be performed by a client device. The client device is a computing device, such as any of the computing devices 106 illustrated in FIG. 1.

The application download process 600 can access 602 an on-line application repository. Once the on-line application repository has been accessed 602, the on-line application repository can be navigated 604 by a user of the computing device to select an application program to be downloaded. Upon selecting an application program, application information pertaining to the selected application program can be displayed 606. The application information can include at least text and/or graphic that explains, characterizes or describes the application program. Next, a decision 608 determines whether a download request has been received for the selected application program. When the decision 608 determines that a download request has not been received, the application download process 600 can return to repeat the block 604 so that the navigation 604 and the display 606 can continue.

On the other hand, when the decision 608 determines that a download request has been received, a device type for the client device can be retrieved 610. The device type is associated with a particular class or category of client devices that might interact with the on-line application repository to download application programs. A decision 612 can then determine whether the device type for the client device is a supported device type for the selected application program. When the decision 612 determines that the device type for the client device is not a supported device type for the selected application program, a message indicating that the download request is denied can be displayed 614. Alternatively, when the decision 612 determines that the device type is a supported device type for the selected application program, download of the selected application program to the client device can be permitted 616. Following the blocks 614 or 616, the application download process 600 can end.

In the application download process 600, a device type for the client device can be retrieved 610. The device type denotes those device types that are compatible with a selected application program. The device type can, for example, represent a certain set of supported device requirements. In one embodiment, the application information for the selected application program that is provided to the client device is a markup language document, such as a web page, that includes an indication of the supported device types. Additionally, for each supported device type, the markup language document can specify one or more of: a device type ID, minimum product version, minimum product version title, minimum product version description, minimum device title, or minimum device description. If the client device is of a type equal to one of the supported device types and the product version of the client device is greater than or equal to the minimum product version, then the selected application program is deemed compatible for use on the client device.

Alternatively, if the client device is of a type equal to (i.e., matches) one of the supported device types but the product version of the client device is less than the minimum product version, then the selected application program is deemed not compatible for use on the client device. In this case, the minimum product version title and/or minimum product version description can be used to form a notification that is presented by the client device. As an example, the notification can inform the user that the client device does no support the selected application program, e.g., "Application Not Compatible", and also provide a reason, e.g., "The application requires a software update on your device". For example, the software update could pertain to an operating system update for the client device. The minimum product version can also pertain to a product version or an operating system version. In one embodiment, the minimum product version title and/or minimum product version description can include a universal resource location (URL) to specify a location for additional information on the incompatibility or for a location to acquire the required component(s).

In another alternative, if the client device is of a type not equal to any of the supported device types, then the selected application program is deemed not compatible for use on the client device. In this case, the minimum device title and/or minimum device description can be used to form a notification that is presented by the client device. As an example, the notification can inform the user that the client device does not support the selected application program, e.g., "Application Not Compatible", and also provide a reason, e.g., "The application cannot be used on this device, it requires device x or device y". In one embodiment, the minimum device title and/or minimum device description can include a universal resource location (URL) to specify a location for additional information on the incompatibility or for a location to acquire the required component(s).

In still another alternative, regardless of whether the client device is of a type matching any of the supported device types, a client device of a certain type or serial number could be prevented from being deemed compatible. In such case, the selected application program would be deemed unavailable to the client device. In this case, a notification can be presented by the client device. As an example, the notification can inform the user that the selected application program is not available for use on the client device. In one embodiment, the notification can include a universal resource location (URL) to specify a location for additional information on the unavailability.

Figure 7A:
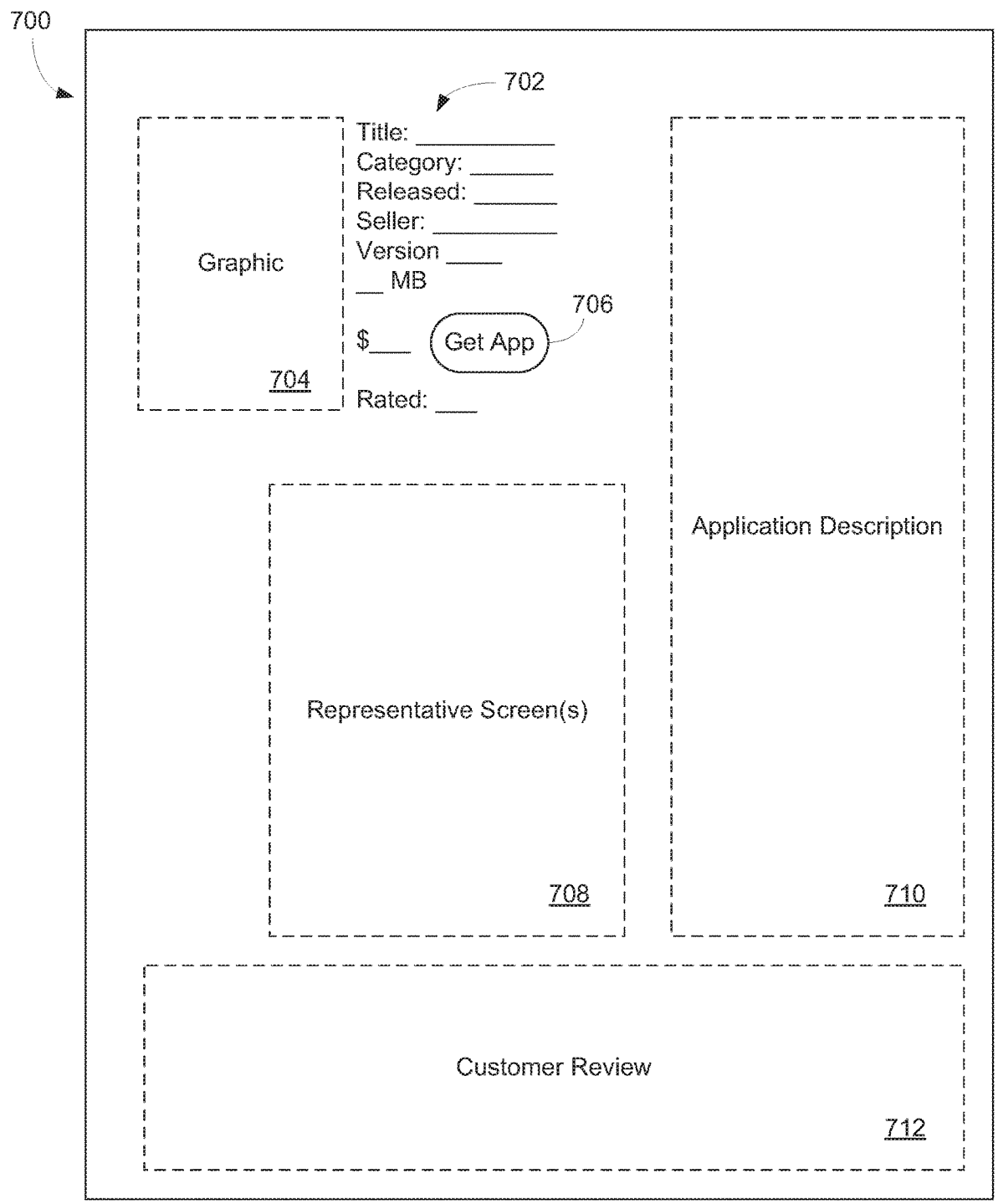
FIGS. 7A-7C are exemplary screen depictions of web pages according to embodiments of the invention.
Figure 7B:
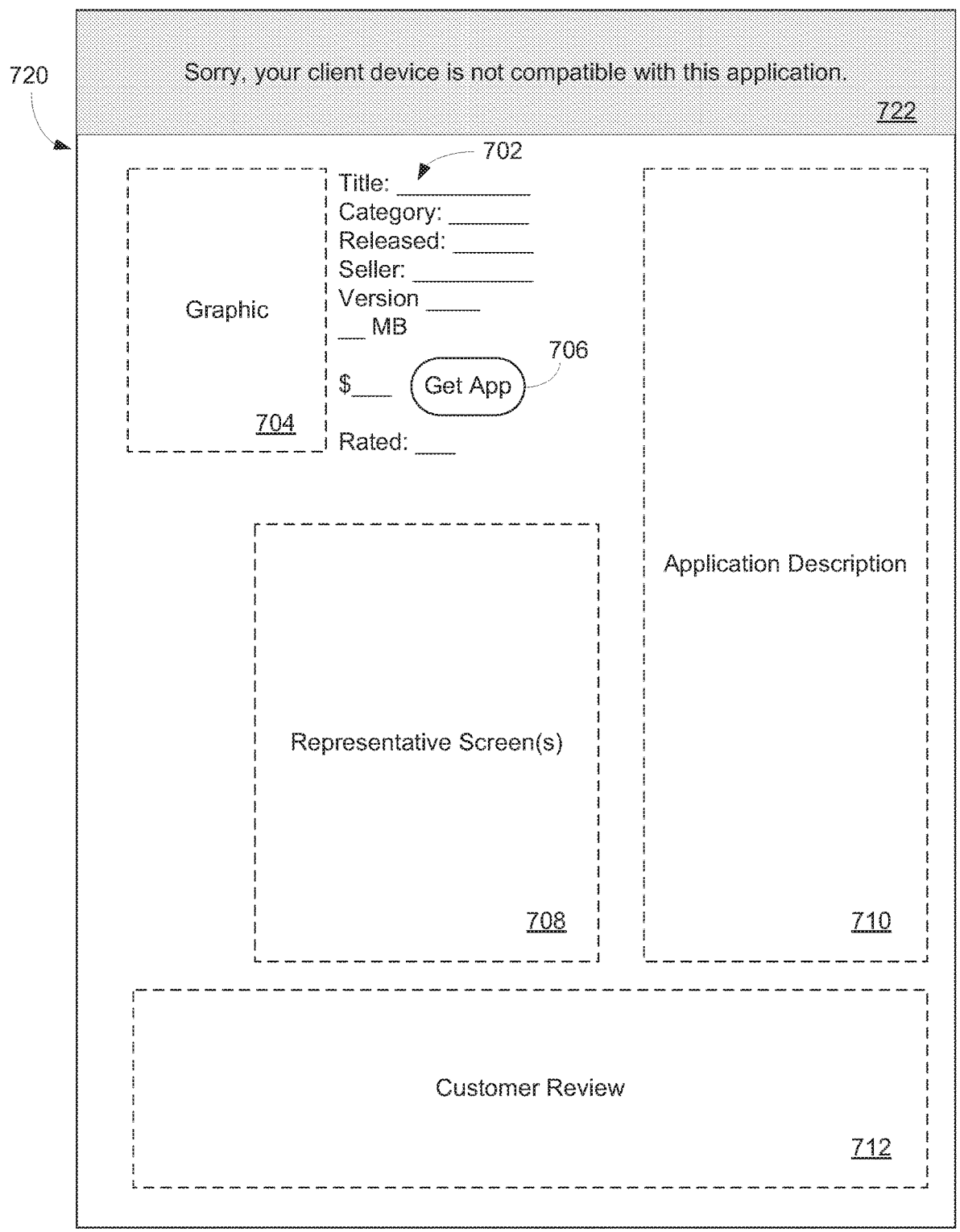
Figure 7C:
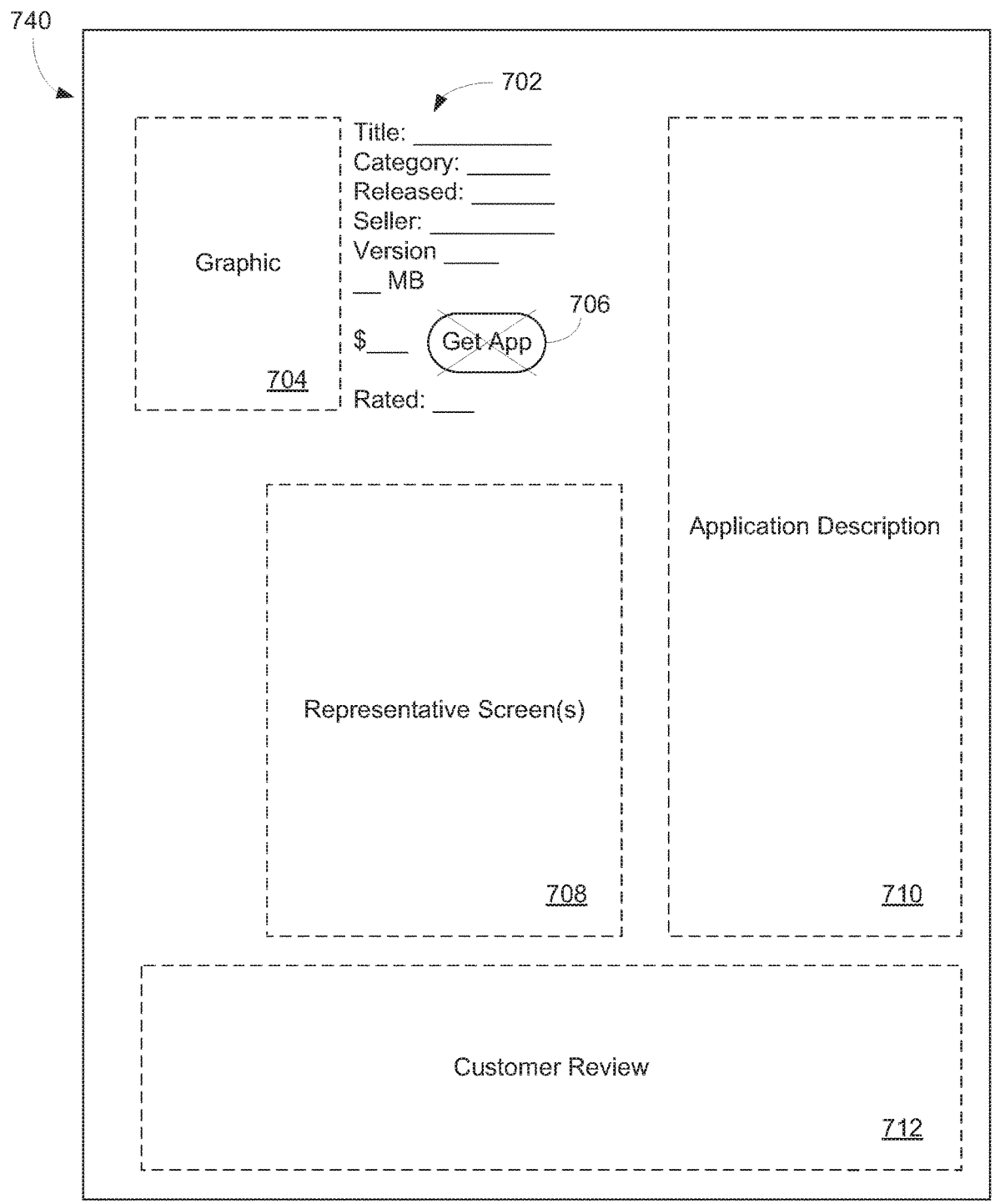

FIGS. 7A-7C are exemplary screen depictions of web pages according to embodiments of the invention. The web pages are provided by an application distribution website hosted by or coupled to an on-line repository and presented on a display device of a client computing device.

FIG. 7A illustrates an exemplary screen depiction of a web page 700 pertaining to an application program according to one embodiment of the invention. The web page can be produced by the processing noted above. As an example, the web page can represent one implementation of application information provided in FIG. 3 or 6, or can represent one implementation of an application description page provided in FIG. 4. The web page 700 can include an application characteristics section 702 that lists characteristics or details of the application program. The characteristics or details can specify one or more of title, category, released date, seller name, version number, size (e.g., in MBs), price and rating. The web page 700 can also include a graphic for the application program, such as a cover image, logo or the like. In addition, the web page 700 can include a "Get App" button 706 that, upon user selection, requests download (or acquisition) of the application program from the on-line repository. The web page 700 can also present one or more representative screens 708 pertaining to the application program. The web page 700 can also include an application description that provides a textual description of the application program. Still further, the web page 700 can include other information, such as customer reviews, pertaining to the application program.

FIG. 7B illustrates an exemplary screen depiction of a web page 720 according to one embodiment of the invention. The web page 720 can be displayed on the client computing device when the requested application program is not permitted to be downloaded to the client computing device. Specifically, as noted above, in response to requesting download of an application program to a client computing device, it can be determined whether the client computing device is able to properly operate the application program. In this embodiment, the web page 720 displays a notification 722 that informs a user of the client computing device that download of the application program is not permitted on the client computing device. In the particular example illustrated in FIG. 7B, the notification displayed states "Sorry, your client device is not compatible with this application". In FIG. 7B, the notification 722 is displayed at the top portion of the web page 720. For example, the web page 720 can result by updating the web page 700 shown in FIG. 7A by inserting the notification 722 at the top of the displayed page. However, in other embodiments, the notification can be displayed anywhere on the web page 720 or in another window (e.g., dialog box). In still another embodiment, the notification can be presented in an audio manner (with or without also displaying the notification 722).

FIG. 7C illustrates an exemplary screen depiction of a web page 740 according to one embodiment of the invention. The web page 740 can be displayed in the client computing device when the requested application program is not permitted to be downloaded to the client computing device. Specifically, as noted above, in response to requesting download of an application program to a client computing device, it can be determined whether the client computing device is able to properly operate the application program. In this embodiment, the web page 740 blocks the user of the client computing device from being able to request an application program that is not permitted to be downloaded to the client computing device. For example, the "Get App" button 706 that, upon user selection, requests download (or acquisition) of the application program from the on-line repository can be disabled. The disablement of the "Get App" button 706 can be visually identified. For example, the "Get App" button 706 is shown in FIG. 7C as being disabled by an "X" superimposed on the button graphics. In alternative embodiments, the "Get App" button 706 could be "Grayed out" to indicate it being inactive or could be completely removed from the web page 740.

The various aspects, features, embodiments or implementations of the invention described above can be used alone or in various combinations.

The invention is preferably implemented by software, hardware, or a combination of hardware and software. The invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of one embodiment of the invention is that those application programs that are digitally delivered to client computing devices from a remote application repository are known to operate on such client computing devices. Other of the application programs that are not able to operate on such client computing devices are not digitally delivered to the client computing devices. Another advantage of one embodiment of the invention is that a remote application repository can efficiently offer the same web page to different client devices, and client device limitations, if any, can be used to modify the web page locally at the client device.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method, comprising:
   receiving a submission comprising an application program and supported device requirements of the application program, wherein the supported device requirements indicate one or more necessary hardware components and one or more necessary software components of a device to allow operation of the application program, wherein the one or more necessary hardware components include a global positioning satellite (GPS) receiver;
   determining whether the application program is approved for distribution;
   sending a request to retry the submission in response to a determination that the application program is not approved for distribution;
   storing the application program to an on-line repository in response to a determination that the application program is approved for distribution, wherein the on-line repository stores a plurality of application programs for distribution;
   generating a web page for displaying information corresponding to the application program and the supported device requirements, the web page comprising a user interface control for initiating download of the application program, wherein the supported device requirements are contained within the web page; and
   causing display of the web page on a computing device, wherein the web page is made available to a plurality of users.

2. The method as recited in claim 1,
   wherein the user interface control is configured to receive selection, by the computing device, of one of the plurality of stored application programs for download, and
   wherein the web page further comprises embedded evaluation program code for determining whether a device requesting download of the application program is a supported device for the application program, the evaluation program code being configured to:
      determine, after displaying the supported device requirements, whether the computing device is a supported device for the requested application program responsive to receiving selection of the requested application program, and receive operating system device information for the computing device;

the method further comprising:

receiving, from the web page, a download request when the evaluation program code determines that the computing device is a supported device for the requested application program, wherein determining whether the computing device is a supported device for the requested application program comprises comparing supported device requirements of the requested application program with the operating system device information for the computing device; and providing the requested application program to the computing device responsive to receiving the download request.

3. The method as recited in claim 2, wherein the evaluation program code is further configured to:

determine a serial number for the computing device; and cause a message to be displayed on the web page that the requested application program is unavailable to the computing device in response to a determination to prevent download of the requested application program based on the serial number of the computing device.

4. The method as recited in claim 1, further comprising:

receiving a second submission in response to sending the request to retry the submission, the second submission comprising an updated application program;

determining whether the updated application program is approved for distribution;

storing the updated application program to the on-line repository in response to a determination that the updated application program is approved for distribution; and causing display of information for the updated application program on the web page along with the supported device requirements.

5. The method as recited in claim 1, wherein the user interface control is configured to receive selection, by the computing device, of one of the plurality of stored application programs for download, and wherein the web page further comprises embedded evaluation program code for determining whether a device requesting download of the application program is a supported device for the application program, the evaluation program code being configured to:

determine, after displaying the supported device requirements, whether the computing device is a supported device for the requested application program responsive to receiving selection of the requested application program, and receive operating system device information for the computing device.

6. The method as recited in claim 2, wherein the evaluation program code is further configured to:

cause a message to be displayed on the web page that download of the requested application program is denied in response to a determination that the computing device is not a supported device for the requested application program; and provide a link to information pertinent to denial of the download of the requested application program in response to a determination that the computing device is not a supported device for the requested application program, the information pertinent to the denial including a location to acquire one or more required components.

7. The method as recited in claim 3, wherein the determination to prevent download of the requested application program based on the serial number of the computing device is made even when the evaluation program code determines that the computing device is a supported device for the requested application program.

8. A non-transitory computer-readable medium comprising instructions, which when executed by at least one processor, causes the at least one processor to perform operations comprising:

receiving a submission comprising an application program and supported device requirements of the application program, wherein the supported device requirements indicate one or more necessary hardware components and one or more necessary software components of a device to allow operation of the application program, wherein the one or more necessary hardware components include a global positioning satellite (GPS) receiver;

determining whether the application program is approved for distribution;

sending a request to retry the submission in response to a determination that the application program is not approved for distribution;

storing the application program to an on-line repository in response to a determination that the application program is approved for distribution, wherein the on-line repository stores a plurality of application programs for distribution;

generating a web page for displaying information corresponding to the application program and the supported device requirements, the web page comprising a user interface control for initiating download of the application program, wherein the supported device requirements are contained within the web page; and causing display of the web page on a computing device, wherein the web page is made available to a plurality of users.

9. The non-transitory computer-readable medium as recited in claim 8, wherein the user interface control is configured to receive selection, by the computing device, of one of the plurality of stored application programs for download, and wherein the web page further comprises embedded evaluation program code for determining whether a device requesting download of the application program is a supported device for the application program, the evaluation program code being configured to:

determine, after displaying the supported device requirements, whether the computing device is a supported device for the requested application program responsive to receiving selection of the requested application program, and receive operating system device information for the computing device;

wherein the operations further comprise:

receiving, from the web page, a download request when the evaluation program code determines that the computing device is a supported device for the requested application program, wherein determining whether the computing device is a supported device for the requested application program comprises comparing supported device requirements of the requested application program with the operating system device information for the computing device; and providing the requested application program to the computing device responsive to receiving the download request.

10. The non-transitory computer-readable medium as recited in claim 9, wherein the evaluation program code is further configured to:
determine a serial number for the computing device; and
cause a message to be displayed on the web page that the requested application program is unavailable to the computing device in response to a determination to prevent download of the requested application program based on the serial number of the computing device.

11. The non-transitory computer-readable medium as recited in claim 8, wherein the operations further comprise:
receiving a second submission in response to sending the request to retry the submission, the second submission comprising an updated application program;
determining whether the updated application program is approved for distribution;
storing the updated application program to the on-line repository in response to a determination that the updated application program is approved for distribution; and
causing display of information for the updated application program on the web page along with the supported device requirements.

12. The non-transitory computer-readable medium as recited in claim 8, wherein the user interface control is configured to receive selection, by the computing device, of one of the plurality of stored application programs for download, and wherein the web page further comprises embedded evaluation program code for determining whether a device requesting download of the application program is a supported device for the application program, the evaluation program code being configured to:
determine, after displaying the supported device requirements, whether the computing device is a supported device for the requested application program responsive to receiving selection of the requested application program, and
receive operating system device information for the computing device.

13. The non-transitory computer-readable medium as recited in claim 9, wherein the evaluation program code is further configured to:
cause a message to be displayed on the web page that download of the requested application program is denied in response to a determination that the computing device is not a supported device for the requested application program; and
provide a link to information pertinent to denial of the download of the requested application program in response to a determination that the computing device is not a supported device for the requested application program, the information pertinent to the denial including a location to acquire one or more required components.

14. The non-transitory computer-readable medium as recited in claim 10, wherein the determination to prevent download of the requested application program based on the serial number of the computing device is made even when the evaluation program code determines that the computing device is a supported device for the requested application program.

15. A system, comprising:
at least one processor, and
a non-transitory computer-readable medium comprising instructions, which when executed by the at least one processor, causes the at least one processor to perform operations comprising:
receiving a submission comprising an application program and supported device requirements of the application program, wherein the supported device requirements indicate one or more necessary hardware components and one or more necessary software components of a device to allow operation of the application program, wherein the one or more necessary hardware components include a global positioning satellite (GPS) receiver;
determining whether the application program is approved for distribution;
sending a request to retry the submission in response to a determination that the application program is not approved for distribution;
storing the application program to an on-line repository in response to a determination that the application program is approved for distribution, wherein the on-line repository stores a plurality of application programs for distribution;
generating a web page for displaying information corresponding to the application program and the supported device requirements, the web page comprising a user interface control for initiating download of the application program, wherein the supported device requirements are contained within the web page; and
causing display of the web page on a computing device, wherein the web page is made available to a plurality of users.

16. The system as recited in claim 15,
wherein the user interface control is configured to receive selection, by the computing device, of one of the plurality of stored application programs for download, and
wherein the web page further comprises embedded evaluation program code for determining whether a device requesting download of the application program is a supported device for the application program, the evaluation program code being configured to:
determine, after displaying the supported device requirements, whether the computing device is a supported device for the requested application program responsive to receiving selection of the requested application program, and
receive operating system device information for the computing device;
wherein the operations further comprise:
receiving, from the web page, a download request when the evaluation program code determines that the computing device is a supported device for the requested application program,
wherein determining whether the computing device is a supported device for the requested application program comprises comparing supported device requirements of the requested application program with the operating system device information for the computing device; and
providing the requested application program to the computing device responsive to receiving the download request.

17. The system as recited in claim 16, wherein the evaluation program code is further configured to:
  determine a serial number for the computing device; and
  cause a message to be displayed on the web page that the requested application program is unavailable to the computing device in response to a determination to prevent download of the requested application program based on the serial number of the computing device.

18. The system as recited in claim 15, wherein the operations further comprise:
  receiving a second submission in response to sending the request to retry the submission, the second submission comprising an updated application program;
  determining whether the updated application program is approved for distribution;
  storing the updated application program to the on-line repository in response to a determination that the updated application program is approved for distribution; and
  causing display of information for the updated application program on the web page along with the supported device requirements.

19. The system as recited in claim 15, wherein the user interface control is configured to receive selection, by the computing device, of one of the plurality of stored application programs for download, and wherein the web page further comprises embedded evaluation program code for determining whether a device requesting download of the application program is a supported device for the application program, the evaluation program code being configured to:
  determine, after displaying the supported device requirements, whether the computing device is a supported device for the requested application program responsive to receiving selection of the requested application program, and
  receive operating system device information for the computing device.

20. The system as recited in claim 16, wherein the evaluation program code is further configured to:
  cause a message to be displayed on the web page that download of the requested application program is denied in response to a determination that the computing device is not a supported device for the requested application program; and
  provide a link to information pertinent to denial of the download of the requested application program in response to a determination that the computing device is not a supported device for the requested application program, the information pertinent to the denial including a location to acquire one or more required components.

* * * * *